Patented June 4, 1940

2,202,990

UNITED STATES PATENT OFFICE 2,202,990

METHINE DYESTUFFS

Edmund B. Middleton, New Brunswick, and George A. Dawson, North Brunswick Township, Middlesex County, N. J., assignors to Du Pont Film Manufacturing Corporation, New York, N. Y., a corporation of Delaware No Drawing. Application March 9, 1937, Serial No. 129,958

8 Claims. (Cl. 260—240)

This invention relates to methine dyes and has for an object the provision of new and useful methine dyes containing a bisazoye nucleus of the oxygen group of the structure

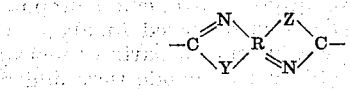

in which Y and Z represent members of the oxygen group of elements and R represents an aromatic nucleus. A further object is the preparation of dyes containing a bis-thiazole nucleus, preferably a benzo-bisthiazole nucleus of the type

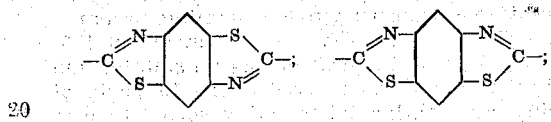

in which the hydrogens of the benzene ring may be further substituted. A still further object is the preparation of dyes of the type described in which one of the nitrogen atoms of the diazole nucleus is trivalent and the other pentavalent. Another object is to produce new and useful sensitizers for gelatino silver halide emulsions. Other objects will appear hereinafter.

These dyes may be prepared by the following steps: (1) converting a diamine to a di-mercapto bisazole of the oxygen group of elements; (2) alkylating to produce the dithioethers; (3) converting the dithioether to a quaternary salt; and (4) reacting the said quaternary salt with a quaternary salt of a heterocyclic base containing an alkyl group in the alpha or gamma positions. In this manner a whole new series of dyes can be produced. Furthermore, if the active alkyl group on the heterocyclic base is methyl, the methine group will be unsubstituted, but if the active group is ethyl, propyl, etc., the methine group will be substituted by methyl, ethyl, etc.

The invention is specifically illustrated with reference to methine dyes containing a bisthiazole nucleus. The mercapto derivatives of bisthiazoles can be obtained by heating amines with carbon disulfide and sulfur under pressure. For example, the bisthiazole having the structure

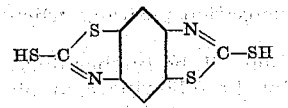

is readily prepared by heating one mole of p-phenylene diamine with 2.2 moles of carbon disulfide and 2 moles of sulfur to 240° C. for six hours in a closed autoclave. Other similar bisthiazoles are obtained by using other diamines, e. g., o-phenylene diamine, m-phenylene diamine, naphthylene diamines, methyl diaminobenzene, and the like.

The di-mercapto derivatives are then alkylated by known methods, so that the di-thioethers are obtained. Thus, the di-thioether having the formula

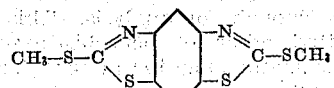

may be prepared by treating the corresponding di-mercapto compound with dimethyl sulfate and alkali in the usual way. The di-thioethers are then converted to the quaternary salts by heating with an ester of organic or inorganic acid (e. g., diethyl sulfate, ethyl p-toluene sulfonate, as described in the examples. The quaternary salts are then converted to cyanines by treating them with quaternary salts of heterocyclic bases containing alkyl groups in the alpha or gamma positions, in the presence of an acid binding agent, as described in the examples.

In carrying out the invention, certain observations have been made as follows. In the first place, it appears that generally only one ring of a bisthiazole nucleus will form a quaternary salt, the other remaining tertiary. Furthermore, generally only one of the thioether groups will condense. Ethyl iodide does not add to the bisthiazole base to form a salt in the case of the bisthiazole from p-phenylene diamine, but quaternary salts are obtained by heating the base with ethyl p-toluene sulfonate or with diethyl sulfate. Depending upon the temperature at which the quaternary salt is formed, the cyanine dyes obtained by condensing the dithioether bisthiazoles with quaternary salts of 2-alkyl thiazoles, 2-alkyl selenazoles, and 2-alkyl oxazoles will vary in shade from yellow to orange, caused probably by the formation of dye containing both rings of the thiazole condensed.

The preferred dyes may be given the general formula

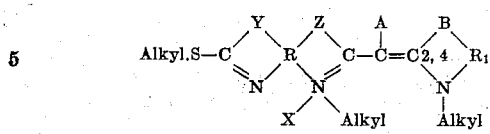

in which Y and Z represent members of the oxygen group of elements (e. g., —O—, —S—, —Se—) preferably sulfur, X represents the negative radical of an acid (e. g., —I, —Cl, —Br, sulfate, chlorate, p-toluene sulfonate, etc.), R and $R_1$ represent aromatic radicals of the benzene or naphthalene series, A represents —H or alkyl, B represents a member of the oxygen group of elements (—O—, —S—, —Se—), dialkyl methylene (e. g., $CH_3-\underset{|}{\overset{|}{C}}-CH_3$)

or vinylene (—CH=CH—), and the numerals indicate condensation positions when B is vinylene.

The invention will be further illustrated but is not limited by the following examples, in which the quantities are stated in parts by weight.

EXAMPLE I

Twenty-five (25) parts of the dimercapto dithiazole from p-phenylenediamine were dissolved in 10% sodium hydroxide solution, containing 20 parts (excess) of caustic. The solution was warmed to 40° C. and treated dropwise with 30 parts of dimethyl sulfate. The flask was shaken continuously and cooled to keep the temperature between 40° and 50° C. A white solid precipitated from the green solution, and after several crystallizations from alcohol, it was obtained pure enough for analysis. This was the dithio methyl ether of benzobisthiazole from p-phenylenediamine, melting at 153° C. and having the formula

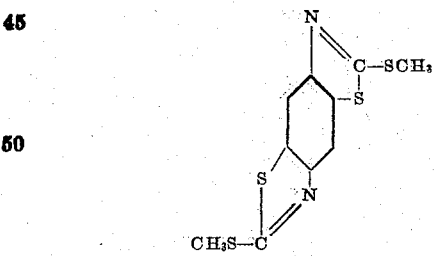

A sample of the base prepared as above described was heated over night in a sealed tube with excess ethyl iodide (over two equimolecular proportions) at ten pounds steam pressure. The product was crystallized several times from alcohol and analyzed. It had a melting point of 155° C. The mixed melting point with the base was 125–136° C. It did not show a qualitative test for iodine. The fact that a mixed melting point of the product from this reaction and the parent substance is noticeably depressed is proof that the two are not identical compounds. The quantitative determination of the sulfur content is in close agreement with the calculated requirements of a compound similar to the parent substance except that one of the methyl groups has been exchanged for an ethyl group.

A second reaction in which the time of heating was prolonged, and the temperature of the reaction increased was run. This time the product was separated into several fractions according to their solubilities in alcohol. They had melting points of 197–200° C. and 240° C. respectively. Neither of these fractions yielded a qualitative test for iodine. It thus appears that this base does not form a salt with ethyl iodide, but the quaternary salts were readily obtained by heating the base with ethyl p-toluene sulfonate or with diethyl sulfate.

*Preparation of the cyanine dye having the formula*

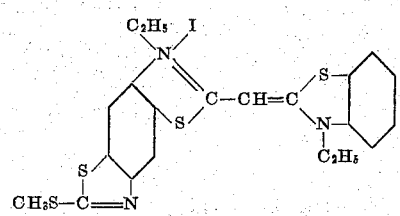

A. Two parts of 2, 2′ dimethyl dimercapto benzobisthiazole from p-phenylenediamine (1 mole) were heated 3 hours at 160° C. with 1.4 parts (excess of 2 moles) of ethyl p-toluene sulfonate. The melt when cool was dissolved in about 24 parts of absolute alcohol and 4.3 parts (2 moles) of 2-methyl benzothiazole ethiodide were added. The mixture was heated to reflux and an excess of fused sodium acetate added over that required to bind the free acid. An orange colored dye precipitated. It was refluxed 15 minutes, recrystallized twice from alcohol, and obtained as brown-orange crystals.

B. About 0.5 part of dimethyl thio ether benzobisthiazole from p-phenylenediamine, prepared as described above, was heated 2 hours at 130–150° C. with .54 part (2 moles) of diethyl sulfate. On cooling, the melt was dissolved in 16 parts of absolute alcohol, heated to reflux with 1.1 parts of 2-methyl benzothiazole ethiodide and .3 part of fused sodium acetate then added. A yellow dye precipitated. The mixture was refluxed for 15 minutes, cooled, and the dye totally precipitated with water, filtered and recrystallized twice from alcohol as yellow-orange crystals. In a silver chloride emulsion it produced sensitivity maxima at 4750Å and 5050Å and extended the sensitivity to 5500Å.

C. One part of 2, 2′ dimethyl thio benzobisthiazole from p-phenylenediamine (melting point 152–153° C.) and 1.1 parts of diethyl sulfate were heated 2 hours at 110–120° C. On cooling, the melt was dissolved in 20 parts ethyl alcohol, treated with 2.15 parts of 2-methyl benzothiazole ethiodide and heated to reflux. Then .5 part of fused sodium acetate was added, and refluxing continued for 15 minutes. The dye reaction proceeded slowly and crystals were not obtained until the solution was cooled; after precipitating with water and recrystallizing twice from alcohol, light yellow crystals were obtained. In a silver chloride emulsion of the dye, the sensitivity maximum was 4700Å and it extended the sensitivity to 5300Å.

D. Two parts (1 mole) of dimethyl thio benzobisthiazole from p-phenylenediamine prepared as above were heated several days with 1.2 parts of diethyl sulfate dissolved in benzene, on a steam bath. Yellow crystals were obtained. The benzene was evaporated under vacuum at 100° C. and the crystals dissolved in 20 parts of absolute alcohol. 2.2 parts of 2-methyl benzothiazole ethiodide were added and the solution heated to reflux. Then .2 part of fused sodium acetate was added and the mixture refluxed 15 minutes. The reaction proceeded slowly, and on cooling a yellow dye precipitated. When recrystallized twice from alcohol, light yellow crystals were obtained.

From the experiments described, it is evident that the chief product formed in the dye reaction is the product containing but one ring of the bisthiazole condensed with one molecule of 2-methyl benzothiazole ethiodide. When the quaternary salt of the bisthiazole is formed at a low temperature, the dye obtained is in its purest form, as evidenced by its light yellow color and the single maximum it produces in a silver chloride emulsion, but when the quaternary salt is formed at a high temperature, a trace of the dye is formed by the condensation of both thiazole rings of the bisthiazole, but not in sufficient measure to change a quantitative sulfur analysis by much. The color of the dye is changed from yellow to orange-yellow, however, and a second sensitizing maximum of a longer wave length is produced by it in a silver chloride emulsion.

EXAMPLE II

Preparation of dye having the formula

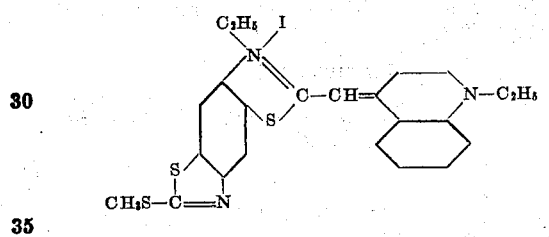

2.9 parts of the ethsulfate from dithio methyl ether of benzobisthiazole from p-phenylenediamine were dissolved in 36 parts of ethyl alcohol and treated with 3 parts of lepidine ethiodide. The mixture was heated to refluxing and 1.1 parts of fused sodium acetate added. A red colored solution was formed and CH3SH escaped. On cooling, dark red crystals formed and were recrystallized twice from alcohol.

When added in suitable amount to a silver bromide emulsion this dye showed sensitizing maximum at 5450 Å. and extended the sensitivity of the emulsion to 6200 Å.

EXAMPLE III

Preparation of dye having following formula

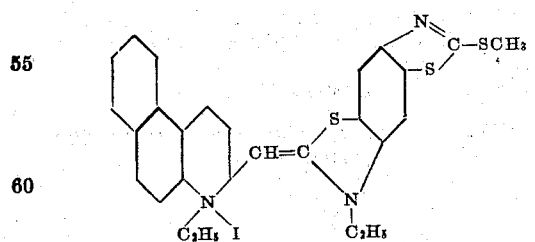

2.4 parts of the ethsulfate of dithio methyl ether of benzobisthiazole from p-phenylenediamine were dissolved in 36 parts of absolute alcohol and treated with 3 parts of beta-naphthoquinaldine ethiodide, heated to reflux and 1.1 parts of fused sodium acetate added. A red colored solution was produced, and on cooling red crystals were formed after recrystallizing twice from alcohol.

The dye is a weak sensitizer for silver bromide emulsion with a maximum at 5450 Å. It extends the sensitivity of emulsion to 5700 Å.

EXAMPLE IV

Preparation of dye having the formula

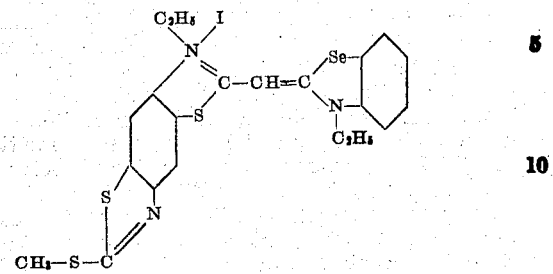

Four (4) parts of the ethylsulfate of the dithio dimethyl ether of benzobisthiazole from p-phenylene diamine were dissolved in 36 parts of absolute alcohol, 5 parts of 2-methyl benzoselenazole ethiodide added, and the mixture heated to reflux. 2.2 parts of fused sodium acetate were added and refluxing continued for 15 minutes. The dye was precipitated with water and recrystallized twice from alcohol as yellow crystals.

It is a powerful blue sensitizer for silver chloride emulsions, with a high maximum at 4800 Å. and extending the sensitivity to 5700 Å.

EXAMPLE V

Preparation of dye having the formula

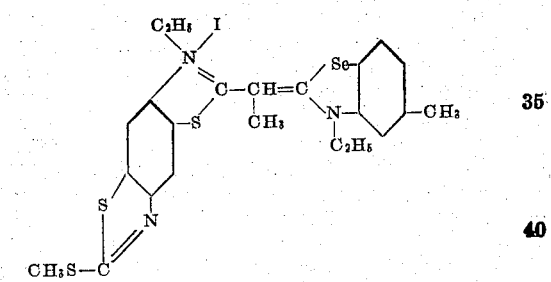

Four (4) parts of the ethyl sulfate of dithio dimethyl ether of benzobisthiazole from p-phenylenediamine and 5.2 parts of 2-ethyl 5-methyl benzoselenazole ethiodide dissolved in 36 parts of absolute alcohol were heated to reflux and 1.1 parts fused sodium acetate added; the refluxing was continued 15 minutes and the dye precipitated with water, recrystallizing twice from alcohol, and obtained as yellow-brown crystals.

This dye is a powerful sensitizer for silver chloride emulsions, having a high maximum at 4800 Å. and a range of sensitivity to 5700 Å.

EXAMPLE VI

A. Preparation of the dimethyl ether of tolyl bisthiazole

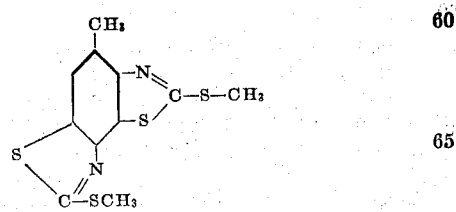

Fifty parts of the dimercaptide of tolyl bisthiazole were heated to reflux in an alcoholic potash solution containing nineteen parts of potassium hydroxide and 240 parts of absolute ethyl alcohol. The heat source was then removed and the solution treated dropwise with forty-seven parts of dimethyl sulfate at a rate just sufficient to keep the mixture boiling. When this has been added, the refluxing was continued for an hour, and then the mixture was cooled. The dimethyl ether started precipitating towards the end of the methylating procedure, and was filtered, washed with two per cent sodium carbonate solution, and then with water and alcohol. After recrystallizing from alcohol the product was obtained as a light yellow solid melting at 135°–136°, rather insoluble in organic solvents and not soluble in water or dilute alkali. It can be vacuum distilled, yielding snow white crystals melting sharply at 136°, but the crystallization alone gives a product of sufficient purity for further work.

B. *Preparation of the cyanine dye having the formula*

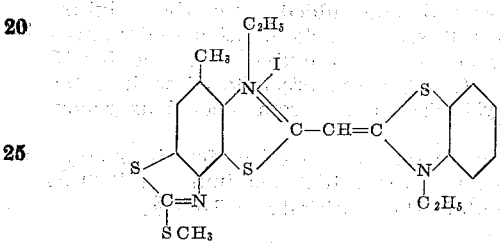

Two parts of the dimethyl thio ether of tolyl bisthiazole were heated with 2 parts of ethyl p-toluene sulfonate for 4 hours at 160–180° C. Then the mixture was cooled and dissolved in 24 parts absolute alcohol, 4.1 parts of 2-methyl benzothiazole ethiodide added and the mixture warmed until solution was complete. Then 1.1 parts of fused sodium acetate were added to the mixture. A yellow precipitate of the dye immediately formed and the reaction was completed by refluxing the mixture five minutes. The odor of methyl thio alcohol was also apparent. The dye was filtered, washed with water and recrystallized from alcohol. When incorporated in a silver halide emulsion, the dye had a sensitizing maximum at 4700 Å. ±50 Å.

EXAMPLE VII

*Preparation of the cyanine dye having the formula*

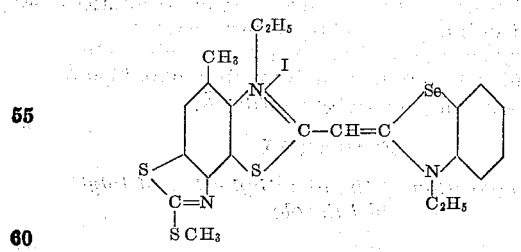

Two parts of the dithio methyl ether of tolyl bisthiazole (prepared as in Example VI A) and 3.2 parts of ethyl p-toluene sulfonate were heated together at 150° C. for four hours. The melt was cooled and dissolved in 40 parts of alcohol. 4.73 parts of 2-methyl benzoselenazole ethiodide were then added, and the solution heated to reflux, with the addition of 1.1 parts of fused sodium acetate, and the refluxing continued for 10 minutes. The yellow precipitate that formed was filtered, washed well with warm water followed by alcohol, and recrystallized from alcohol as yellow crystals. The sensitizing maximum was at 4750 Å. ±50 Å.

EXAMPLE VIII

*Preparation of the cyanine dye having the formula*

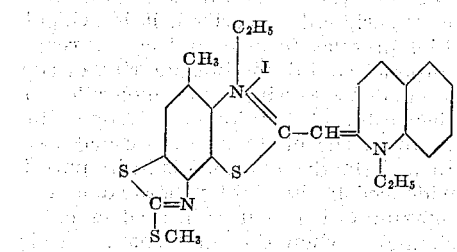

Two parts of the dithio methyl ether of tolyl bisthiazole (prepared as in Example VI A) were heated with 3.2 parts of ethyl p-toluene sulfonate at 150°–180° C. for four hours. The melt was cooled and 24 parts of absolute alcohol added. Then 4 parts of quinaldine ethiodide were added and the mixture heated to reflux, after which 1.1 parts of fused sodium acetate were added and refluxing continued 15 minutes. A brick red precipitate formed, was filtered, washed with water and recrystallized from alcohol, as scarlet crystals. The sensitizing maximum was at 5450 Å. ±50 Å.

EXAMPLE IX

*Preparation of the cyanine dye having the formula*

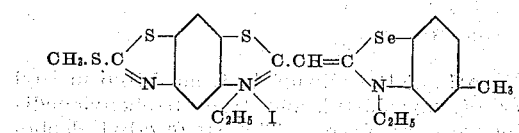

Three parts of the di-thio methyl ether of benzobisthiazole from m-phenylenediamine was heated 2 hours at 130–140° C. with 3.5 grams of diethyl sulfate. The melt was cooled and dissolved in 40 parts of alcohol. To this solution 9.2 parts of 2.5 dimethyl benzoselenazole ethiodide were added and the mixture heated to reflux; then 2.05 parts of fused sodium acetate were added and refluxing continued for 20 minutes thereafter. The yellow-orange dye that precipitated was filtered and recrystallized from alcohol.

When 0.015 grams of this dye dissolved in 30 cc. of alcohol is added to one liter of silver chloride emulsion, an extra sensitivity is added, extending to 5300 Å. and with a maximum at 4700 Å.

EXAMPLE X

*Preparation of the cyanine dye having the formula*

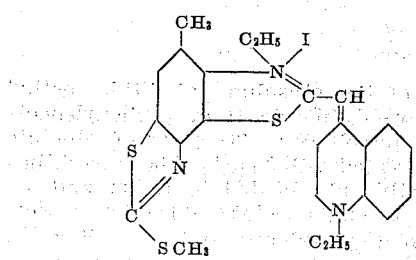

The ethsulfate of 2-2' dithio methyl ether of tolyl bisthiazole, prepared by heating 2 parts of the 2,2' dithio methyl ether of tolyl bisthiazole from tolyl m-diamine 2 hours at 130–140° C. with 2 parts of diethyl sulfate, was dissolved in 40 parts of alcohol. It was then treated with 4 parts of lepidine ethiodide, heated to reflux, and 1.1 parts of fused sodium acetate added. The mixture was refluxed 15 minutes, cooled and filtered from the red colored crystals which were recrystallized from alcohol.

If .015 gram of this dye is dissolved in 30 cc. of alcohol and added to one liter of a photographic emulsion, an extra sensitivity is conferred, extending to 5800 A. and with a maximum at 5500 A.

Example XI

Preparation of the cyanine dye having the formula

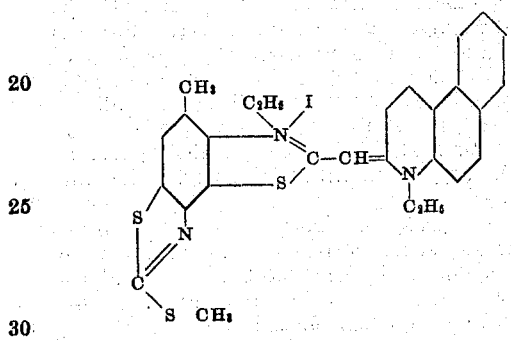

0.9 part of b-naptha quinaldine ethiodide was dissolved in 12 parts of alcohol and treated with .4 part of the ethsulfate from the dithio methyl ether of tolyl bisthiazole. The mixture was heated to reflux and then .19 part of fused sodium acetate added. Refluxing was continued for 15 minutes and then the mixture was cooled, filtered from red crystals which were recrystallized in alcohol.

If .015 gram of this dye in 30 cc. of alcohol is added to one liter of photographic emulsion, an extra sensitivity is conferred that extends to 5800 A. with a maximum at 5600 A.

Example XII

Preparation of the cyanine dye having the formula

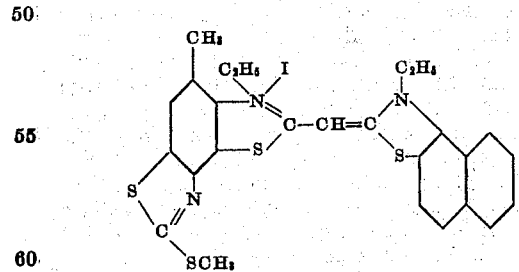

Four parts of the ethsulfate of 2,2' dimethyl thioether of tolyl bisthiazole were dissolved in 20 parts of alcohol, and treated with 2.3 parts of the ethsulfate of 2 methyl b-napthothiazole also dissolved in 20 parts of alcohol. The solution was heated to reflux and then treated with 1.1 parts of fused sodium acetate. It was refluxed 15 minutes, cooled and filtered and the orange-brown precipitate recrystallized from alcohol.

When .015 grams of this dye is dissolved in 30 cc. of alcohol and added to 1 liter of emulsion, an extra sensitivity is conferred that extends to 5700 A. and has a maximum at 4800 A.

Example XIII

Preparation of the cyanine dye having the formula

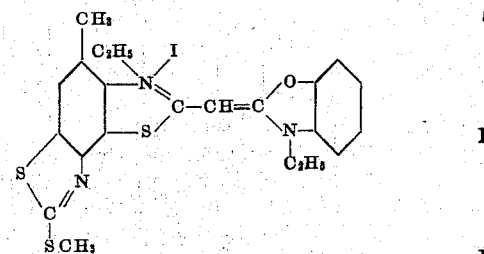

To prepare the dye whose structure is drawn above, follow the directions and quantities in Example XII, with the exception that 3.9 parts of 2 methyl benzoxazole ethiodide are substituted for the 2 methyl b-napthothiazole ethsulfate. After recrystallizing from alcohol, dark brown crystals are obtained.

When .015 gram of this dye is dissolved in 30 cc. of alcohol and added to one liter of emulsion, an extra sensitivity is conferred that extends to 5400 A. and has a minor peak at 4700 A. and a major peak at 4300 A.

Example XIV

Preparation of the cyanine dye having the formula

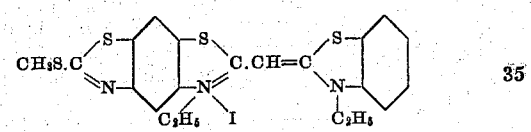

Two parts of 2,2' dithio methyl ether of benzobisthiazole prepared from m-phenylenediamine were heated 2 hours at 130–140° C. with 2 parts of diethyl sulfate. To the cooled melt was added 3.47 parts of 2-methyl benzothiazole ethiodide dissolved in 40 parts of alcohol. The mixture was heated until solution was complete, and then brought to a boil and 1.15 parts of fused solium acetate added. A yellow color developed in the solution and a solid precipitated. Refluxing was continued for 15 minutes, and the mixture then cooled and filtered. After three crystallizations from alcohol, yellow-brown crystals were obtained.

When .015 gram of this dye is dissolved in 30 cc. of alcohol and added to one liter of emulsion, an extra sensitivity is conferred that extends to 5400 A., with maxima at 5300, 4700 and 4300 A.

Example XV

Preparation of the cyanine dye having the formula

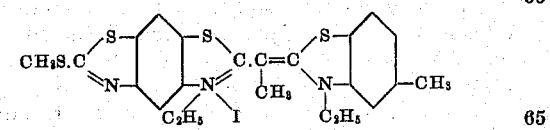

The above dye was obtained by the procedure of Example XIV with the exception that 4.6 parts of 2 ethyl 5 methyl benzothiazole ethiodide was substituted for 2 methyl benzothiazole ethiodide. When recrystallized twice from alcohol, light yellow crystals were obtained.

When .015 gram of this dye is dissolved in 30 cc. of alcohol and added to one liter of emulsion, an extra sensitivity is conferred that extends to 5500 A. and has maxima at 5300, 4700 and 4300 A.

EXAMPLE XVI

Preparation of the cyanine dye having the formula

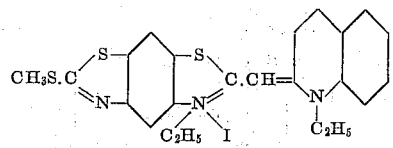

As in the previous example, the above dye was prepared according to the procedure of Example XIV, using 4.2 parts of quinaldine ethiodide in place of 2 methyl benzothiazole ethiodide. When recrystallized twice from alcohol yellow-brown crystals were obtained.

When .015 gram of this dye was dissolved in 30 cc. of alcohol and added to one liter of emulsion, an extra sensitivity is conferred that extends to 5600 Å. with maximum at 5400 Å.

EXAMPLE XVII

Preparation of the cyanine dye having the formula

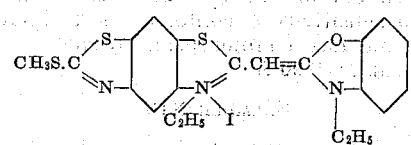

The above dye was prepared according to instructions given in Example XIV, using 4 parts of 2 methyl benzoxazole ethiodide in place of 2 methyl benzothiazole ethiodide. The dye after crystallizing twice was obtained as olive green crystals.

When .015 gram of this dye was dissolved in 24 parts of alcohol and added to one liter of emulsion, an extra sensitivity was conferred that extended to 5200 Å. with maxima at 4800 Å. and 4300 Å.

EXAMPLE XVIII

Preparation of the cyanine dye having the formula

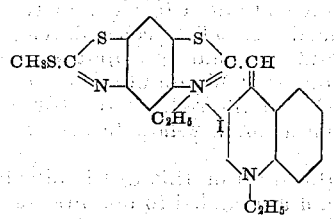

The above dye was prepared as in Example XIV, using 4.2 parts of lepidine ethiodide in place of 2 methyl benzothiazole ethiodide. The product when crystallized twice from alcohol was obtained as dark red crystals.

When 0.015 gram of this dye was dissolved in 24 parts of alcohol and added to one liter of emulsion, an extra sensitivity was conferred that extended to 5800 Å. and had a maximum at 5400 Å.

Variations may be made in preparing the dyes without departing from the invention. Thus, instead of using lepidine ethiodide, we may use quaternary salts of 6-methyl lepidine, 6-ethoxy lepidine, 7:8-benzolepidine, or other lepidine derivatives in the examples. Instead of 2-methyl quinoline ethiodide, we may use quaternary salts of 2-methyl quinoline derivatives, for example, containing alkyl substituents (methyl, ethyl, etc.), halogen (-I, -Cl, -Br, -F), or alkoxy (methoxy, ethoxy, etc.) in the aromatic ring. Instead of quaternary salts of unsubstituted 2-alkyl oxazoles, selenazoles and thiazoles, we may use the substituted derivatives, e. g., 2:5-dimethyl benzo thiazole ethiodide, 2:5-dimethyl-benzo selenazole ethiodide, 2-ethyl-5-methyl-benzo thiazole ethiodide, 2-ethyl-5-methyl-benzo selenazole ethiodide, and other substituted derivatives containing alkyl (e. g., methyl, ethyl, etc.), alkoxy (methoxy, ethoxy, etc.) halogen (-I, -Br, -Cl) or dialkylamino (dimethylamino, diethylamino, etc.) in the aromatic ring. Other intermediates having condensed rings, e. g., 2-methyl alpha naphthoselenazole ethiodide, may be used. If desired, the 2-alkyl quaternary salt may be a simple thiazolo, selenazolo, or oxazolo base, e. g., a quaternary salt of 2:4-dimethyl thiazole, 2:4-dimethyl oxazole, 2:4-dimethyl selenazole, 2-methyl-4-phenyl thiazole, 2-methyl-4:5-diphenyl thiazole, and the like. The aromatic portion of the diazole nucleus may also contain other substituents, e. g., other alkyl substituents, or alkoxy radicals (methoxy, ethoxy, etc.) in place of hydrogen. The 2-alkyl quaternary salt may also be an indolenine, e. g., 2:3:3-trimethyl-indolenine ethiodide.

While we preferably form the new cyanines from the thioether derivatives, we may employ the corresponding intermediates except that the thioether groups are replaced by alkyl groups, e. g., 2:6-dimethyl benzobisthiazole

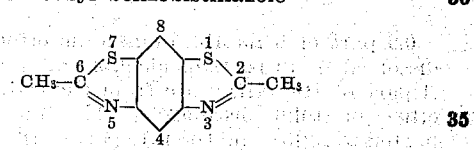

This is converted to the quaternary salt in the usual manner and one mole thereof reacted with 1 to 2 moles of alpha iodo quinoline ethiodide, or other 2-halogeno quinolino quaternary salt, in the presence of an acid binding agent and solvent, e. g., alcohol and caustic alkali, or an organic base such as triethylamine, tri-n-propylamine, etc., to produce a pseudocyanine. With 4-halogeno quinolines, in the presence of a condensing agent, the isocyanines are formed.

If a carbocyanine is desired, a dialkyl bisthiazole quaternary salt, or other dialkyl bisazole quaternary salt, is reacted with an alkyl ortho ester such as ethyl ortho formate, ethyl ortho acetate, etc. This produces a symmetrical carbocyanine containing two bisthiazole nuclei. To produce lateral carbon atom substitution diethyl bisthiazole quaternary salts may be employed. To produce an unsymmetrical carbocyanine, the dialkyl thiazole may be reacted with a diarylamidine, e. g., diphenyl formamidine, diphenyl acetamidine, etc., and the resultant intermediate reacted with a quaternary salt of a 2-alkyl oxazole, thiazole, or selenazole such as those described above. By using the 2-ethyl and higher derivatives, substitution on the lateral carbons of the trimethine chain is obtained. This reaction is usually effected in the presence of acetic anhydride and sodium acetate.

Symmetrical and unsymmetrical methine dyes having a pentamethenyl chain may be prepared by reacting a dialkyl dithiazole quaternary salt with a beta anilino acrolein anil in acetic anhydride and then condensing the resultant intermediate compound with the same or another quaternary salt, e. g., 2-methyl benzothiazole ethiodide, 2-methyl benzoselenazole ethiodide, etc., in the presence of acetic anhydride and sodium acetate.

The dyes of this invention may be described generically as bisazole methine alkyl salts. They are characterized by a bisazole nucleus which is connected through a methenyl carbon chain to a heterocyclic nitrogen nucleus as in all methine dyes and have alkyl groups on the quaternary nitrogen atoms. The various types of substituents may vary widely as will be apparent to one skilled in the art.

In the examples, we usually prepare the bisthiazole quaternary salts by reacting 1 mole of a dimercapto bisthiazole with 2 or more moles of an ester of an organic or inorganic acid. However, we may effect the reaction with 1 mole of ester per mole of dimercapto bisthiazole. In other words, we may use the theoretical proportions required to form the desired quaternary salt or we may use an excess of the ester. If an excess of the dimercapto bisthiazole is employed, the reaction will not be complete, although some reaction will occur. In forming the dyes from the quaternary salts of the dithiazole derivatives and the other heterocyclic compounds having reactive alkyl groups, we sometimes employ 2 moles of said heterocyclic compounds per mole of bisthiazole quaternary salt. This reaction, however, may be effected with 1 mole of one of said heterocyclic compounds per mole of bisthiazole quaternary salt. Naturally, where an excess is used, it does no harm and the unreacted compounds can readily be removed from the reaction mixture. For instance, in Example II, we could effect the reaction with 2.2 parts of the eth-sulfate, 1.5 parts of lepidine ethiodide and .5 part of sodium acetate. Similarly, we can employ smaller proportions of heterocyclic quaternary salt and acid binding agent in the examples following Example II. At the same time we can decrease the proportions of ester used in forming the dithiazole quaternary salt. For instance, in Example IX, we can effect the reaction with 2.8 parts of dimethyl dithiobenzobisthiazole, 1.5 parts of diethyl sulfate, 3.7 parts of dimethyl benzoselenazole ethiodide and 1 part of sodium acetate.

The method of preparing the photographic emulsions is too well known to require further description. In general, the dyes may be used in any type of gelatino silver halide emulsion. They may also be used for dyeing fibers and fabrics.

The term "benzobisazole" is used herein in accordance with well accepted terminology in defining organic compounds. Azoles are defined as poly-hetero-atomic five membered rings which may contain, for example, N and O, N and S, N and Se, or only N atoms. The term "benzo azole" refers to a compound in which two ortho carbon atoms of a benzene ring are shared by an azole ring. Hence a benzobisazole is a compound in which two pairs of ortho carbon atoms of a benzene ring are shared by two azole rings. Specific examples of this nomenclature are benzobisoxazole, Chemical Abstracts, vol. 16, page 1428, benzobisselenazole, Chemical Abstracts, vol. 18, page 2895, and benzobisthiazole, Chemical Abstracts, vol. 16, page 2509. The expressions "benzene series," "naphthalene series," and "quinoline series" are used herein to refer to compounds having a benzene, naphthalene, or quinoline nucleus in which one or more hydrogen atoms attached to the carbon atoms thereof may or may not be substituted by a substituent atom or group.

As many apparently widely different embodiments of this invention may be made without departing from the spirit and scope thereof, it is to be understood that we do not limit ourselves to the specific embodiments thereof except as described in the following claims.

We claim:

1. An N:N-dialkyl cyanine salt consisting of a heterocyclic group and a heterocyclic group in salt form, one of said heterocyclic groups being a benzobisthiazole radical and the other of said heterocyclic groups being an azole radical including in its nucleus an element of the oxygen group selected from the group consisting of oxygen, sulfur and selenium group linked by a single methine carbon between a carbon atom alpha to the nitrogen atom of one thiazole nucleus of the benzobisthiazole radical and the carbon atom alpha to the nitrogen atom of the azole radical.

2. An N:N-dialkyl cyanine salt consisting of a heterocyclic group and a heterocyclic group in salt form, one of said heterocyclic groups being a benzobisthiazole radical and the other of said heterocyclic groups being a quinoline nucleus linked by a single methine carbon between a carbon atom alpha to the nitrogen atom of one thiazole nucleus of the benzobisthiazole radical and one of the carbon atoms in the alpha and gamma positions of the quinoline nucleus.

3. A dye having the following general formula

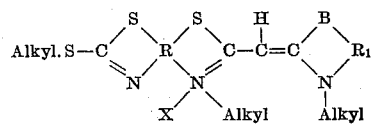

in which X represents the negative radical of an acid, R and R₁ represent benzene nuclei, and B represents a member of the oxygen group of elements selected from the group consisting of oxygen, sulfur and selenium.

4. A dye having the following general formula

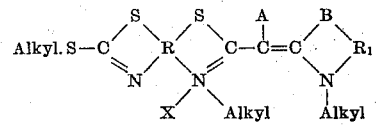

in which X represents the negative radical of an acid, R and R₁ represent benzene nuclei, A represents alkyl, and B represents a member of the oxygen group of elements selected from the group consisting of oxygen, sulfur and selenium.

5. A dye having the following general formula

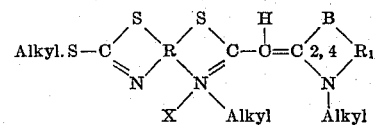

in which X represents the negative radical of an acid, R and R₁ represent radicals of the benzene series, B represents vinylene and the numerals represent the condensation positions.

6. A method of preparing dyes containing a benzobisthiazole nucleus which comprises heating a μ,μ' dialkyl dithioether benzobisthiazole alkyl mono-quaternary salt with an alkyl heterocyclic mono-quaternary salt containing a reactive aliphatic hydrocarbon group attached to a carbon atom of the heterocyclic ring in one of the positions alpha and gamma to the nitrogen atom, in the presence of a basic condensing agent.

7. A method of preparing dyes containing a benzobisthiazole nucleus which comprises heating a μ,μ' dimethyl dithioether dithiazole alkyl mono-quaternary salt with an alkyl heterocyclic mono-quaternary salt containing a reactive aliphatic hydrocarbon group attached to a carbon atom of the heterocyclic ring in one of the positions alpha and gamma to the nitrogen atom, in the presence of a basic condensing agent.

8. A N:N-dialkyl cyanine salt consisting of a heterocyclic group and a heterocyclic group in salt form, each of said heterocyclic groups containing a hetero-nitrogen atom as part of a heterocyclic ring, one of said heterocyclic groups being a benzobisthiazole nucleus and the other being a nucleus selected from the group consisting of oxazole, thiazole, selenazole, indolenine and quinoline nuclei, said heterocyclic groups being linked together by a methine bridge between a carbon atom in alpha position to a hetero-nitrogen atom of said benzobisthiazole nucleus and a carbon atom in one of the positions alpha and gamma to the hetero-nitrogen atom of said other heterocyclic group.

EDMUND B. MIDDLETON.
GEORGE A. DAWSON.

CERTIFICATE OF CORRECTION.

Patent No. 2,202,990. June 4, 1940.

EDMUND B. MIDDLETON, ET AL.

It is hereby certified that error appears in the printed specification of the above numbered patent requiring correction as follows: Page 1, first column, line 3, for "bisazoye" read --bisazole--; page 5, second column, line 45, for "solium" read --sodium--; page 7, second column, line 14, claim 1, strike out "group" and insert the same before "selected" in line 13, same claim; line 73, claim 7, for "dithiazole" read --benzobisthiazole--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.